United States Patent Office 2,712,517
Patented July 5, 1955

2,712,517

PRODUCTION OF TETRACYCLINE AND SUBSTITUTED TETRACYCLINES

Alexander Gourevitch, Syracuse, and Joseph Lein, Manlius, N. Y., assignors to Bristol Laboratories Inc., Syracuse, N. Y., a corporation of New York No Drawing. Application March 3, 1954,
Serial No. 413,956

13 Claims. (Cl. 195—114)

This invention relates to improvements in production by fermentation of tetracycline-type antibiotics and, more particularly, to the use of hydroxylated polyhydrobenzoic acids as precursors in such fermentations.

The tetracycline type or family of antibiotics are useful therapeutic agents exhibiting a broad spectrum of activity and comprising the parent compound, tetracycline, and derivatives such as chlortetracycline (aureomycin) and 5-oxytetracycline (terramycin) and 5-chlortetracycline and 7-oxytetracycline and the like. These tetracycline-type antibiotics are prepared by fermentation procedures but are found only in low concentration in the broths.

Thus, 7-chlortetracycline (aureomycin) is produced by fermentation of *Streptomyces aureofaciens* according to U. S. Patent 2,482,055 and oxytetracycline (terramycin) is produced by fermentation of *Streptomyces rimosus* according to U. S. Patent 2,516,080. The fermentation procedures and media used therein are also useful in tetracycline production.

Tetracycline is prepared by the cultivation under particular controlled conditions of many species of Streptomyces, including *S. aureofaciens* (NRRL 2209) and a hitherto undescribed species of micro-organism which we have tentatively called Streptomyces BL 567201 now known as *Streptomyces viridifaciens* which was isolated from a sample of soil. A culture of the living organism which has been isolated from this soil and identified as *Streptomyces viridifaciens* has been deposited in the American Type Culture Collection, Washington, D. C., and added to its permanent collection of microorganisms as ATCC 11989. The description of this organism is set forth in the following.

The organism *Streptomyces viridifaciens* sp. nov. which produces tetracycline belongs to the genus currently distinguished as Streptomyces. Growth of this organism is good on glycerol asparagine beef extract agar at 30° C. On this medium mouse-gray aerial hyphae are formed and a yellowish-green pigment is secreted into the agar medium. The mycelium is composed of branched hyphae, the younger elements of which are gram-positive. Conidia are produced on aerial hyphae.

The above color descriptions are from: Dictionary of Color; by Maerz and Paul, 1st edition.

*Streptomyces viridifaciens* was differentiated from a strain of *S. aureofaciens* (NRRL 2209) obtained from the Northern Regional Research Laboratory, Peoria, Illinois, where it had been deposited as an authentic aureomycin-producing strain, by observation of growth characteristic on glycerol asparagine beef extract agar and Czapek-Dox agar containing 1% dextrin. The agar mixtures employed and the results obtained were as follows:

Glycerol Asparagine Beef Extract Agar

| | | |
|---|---|---|
| Glycerol | per cent | 1 |
| Asparagine | do | 0.05 |
| Beef extract | do | 0.2 |
| K₂HPO₄ | do | 0.05 |
| Agar | do | 1.5 |
| Sterile water q. s. | per cent | 100 |
| pH | | 7.2 |

| | Streptomyces viridifaciens | Streptomyces aureofaciens |
|---|---|---|
| Growth | Good | Good. |
| Sporulation | do | Do. |
| Diffusible pigment | Yellowish-green | None. |
| Spiral formation | Abundant, loosely wound | Do. |
| Aerial hyphae | Mouse-gray | Rose-gray. |
| Reverse | Brown | Olive-drab. |

Dextrin Czapek-Dox

| | | |
|---|---|---|
| NaNO₃ | per cent | 0.2 |
| K₂HPO₄ | do | 0.1 |
| MgSO₄ | do | 0.05 |
| KCl | do | 0.05 |
| FeSO₄ | | trace |
| Agar | per cent | 1.5 |
| Sterile water q. s. | do | 100 |
| pH | | 7.2 |

| | Streptomyces viridifaciens | Streptomyces aureofaciens |
|---|---|---|
| Growth | Fair to good | Fair. |
| Sporulation | Good | Poor. |
| Diffusible pigment | None | None. |
| Spiral formation | Abundant, loosely wound | Sparse, very loosely wound. |
| Aerial hyphae | Mouse-gray | Buff to gray. |
| Reverse | Light brown | Buff to tan. |

The *Streptomyces viridifaciens* is further characterized by production of an intense bluish-green pigment when grown in submerged culture in a medium containing 1% sucrose, 1% soy bean meal, 1% soy peptone, 1.5% KH₂PO₄, and 0.5% (NH₄)₂HPO₄: *Streptomyces aureofaciens* (NRRL 2209) does not produce this pigment.

*Streptomyces viridifaciens* was further distinguished from *Streptomyces aureofaciens* by the following, tabulated observations.

| Medium | S. aureofaciens NRRL 2209 | Streptomyces viridifaciens |
|---|---|---|
| Nutrient agar | Good growth. Production of aerial hyphae and spores is inhibited somewhat and is white to gray in color. Straw soluble pigment. | Good growth. No aerial mycelium, colony tan to light brown. Cinnamon soluble pigment. |
| Asparagine-meat extract-dextrose agar. | Good growth. Abundant aerial mycelium and spores, cement gray to frost gray in color. India buff soluble pigment. | Good growth. Abundant aerial mycelium and spores, gull colored India buff soluble pigment. |
| Potato slants | Growth raised, surface nodulate, India buff color. | Growth raised, surface nodulate, ecru - beige color. |
| Litmus Milk | Neither significant pH change nor apparent peptonization in 15 days. Slight growth. | Alkaline with peptonization. Very good growth. |

It is to be understood that for the production of tetracycline we do not wish to limit ourselves to this particular organism or to organisms fully answering the above description which is given merely for illustrative purposes. We especially wish to include the use of organisms which are mutants produced from the described organism by mutating agents such as X-radiation, ultra-violet radiations, nitrogen mustards, etc.

The object of the present invention is to provide a nutrient, or as it may be called, a precursor, which will stimulate the micro-organisms to generate increased yields of the desired substance, e. g. tetracycline, and also to generate the desired product at an increased rate.

In a biological process, as in any chemical process, increased efficiency in the transformation of raw material into the desired end product is of prime importance. Where the yield in such process is small and the cost of recovery of the desired product from a large proportion of waste material is high, the yield becomes a controlling factor in the cost of production.

In the production of antibiotic substances by micro-organisms in present fermentation processes, the yield of these substances is only a small fraction of one percent of the weight of nutrient materials used in the culture media. Consequently, the desired substance in the spent culture medium must be concentrated and isolated from relatively large volumes of liquor. This is commonly done by means of selective adsorption, precipitation or solvent extraction processes. In addition to this, the fermentation processes are relatively slow, requiring several days to provide a maximum yield of product. As a result of these limiting factors, large and numerous units of equipment are required to provide even small quantities of purified product from a single fermentation. This is the situation, for example, in the case of tetracycline production.

In the process for producing tetracycline, a suitable micro-organism such as *Streptomyces viridifaciens* or *Streptomyces aureofaciens* may be cultured in an aqueous medium containing representative materials selected from three broad classes of the following essential ingredients:

(a) An organic nitrogen source, such as peptone, beef extract, yeast extract, corn steepwater, vegetable protein material such as soybean meal, casein, enzyme-converted proteins, grain fermentation residues, and the like.

(b) A carbohydrate, such as glucose, corn syrup, starch, modified starches, dextrins, soybean carbohydrate, lactose, maltose.

(c) A mineral supplement, such as sodium chloride, magnesium sulfate, ferrous sulfate, potassium phosphate, ammonium sulfate, potassium sulfate, calcium carbonate, sodium bromide, etc., or combinations of these.

The concentrations of substances from these classes in the medium may be varied widely depending upon the combination chosen, but ordinarily varies between 0.1 percent and 5 percent, governed by the fermentation process being employed.

The culturing of micro-organisms for the production of tetracycline either may be carried out by the surface-growth method or by the submerged-growth method. Both of these means have been employed in experimental work but in a commercial process the organism is usually grown by the submerged method in large aerated tanks.

The yield of tetracycline is affected by many factors. Foremost of these is the nutrient medium composition itself, which can vary in the nature, concentration and proportions of the individual components employed. The balance between the nitrogen, carbohydrate and mineral ingredients is very sensitive and a combination of protein and sugars which give good results with one mineral supplement might be almost worthless with a different mineral supplement or a different proportion of the same one. This situation is complicated by the presence in most naturally occurring proteins and carbohydrates of various mineral ingredients. Another factor influencing yield is the process of fermentation to be practiced, that is to say, the selection of the proper physical conditions. A medium that gives optimum results under one set of operating conditions may be inferior in another. Aeration, agitation, temperature, time and type of equipment are important variables.

Despite the large amount of information available as to preferred media with respect to both ingredients and concentration and as to operating conditions, the yields, based on the weight of nutrient materials used, are still so low, however, that the production cost of tetracycline is undesirably high.

There is now discovered, according to the present invention, a process for the production of tetracycline which comprises growing under aerobic conditions a culture of a tetracycline-producing species of Streptomyces in an aqueous, nitrogenous nutrient containing carbohydrate solution in the presence of a hydroxylated polyhydrobenzoic acid until substantial antibacterial activity is imparted to said solution.

In one embodiment, the present invention comprises a process for the production of tetracycline which comprises growing under aerobic conditions a culture of a tetracycline-producing species of Streptomyces in an aqueous, nitrogenous nutrient containing carbohydrate solution in the presence of a member selected from the group consisting of quinic acid, 5-dehydroquinic acid, shikimic acid, 5-dehydroshikimic acid, salts thereof and metabolically convertible derivatives thereof until substantial antibacterial activity is imparted to said solution.

The hydroxylated polyhydrobenzoic acids of the present invention include quinic acid (1,3,4,5-tetrahydroxy-hexahydrobenzoic acid), 5-dehydroquinic acid (5-keto-1,4α,3β-trihydroxy-1-cyclohexane-1-β-carboxylic acid), shikimic acid (3,4,5-trihydroxy-$\Delta^1$-tetrahydrobenzoic acid) also called 3β,4α,5α-trihydroxy-$\Delta^{1:6}$-cyclohexene-1-carboxylic acid, 5-dehydroshikimic acid (5-keto-3,4-dihydroxy-$\Delta^{1:6}$-cyclohexene-1-carboxylic acid), dihydroshikimic acid (3,4,5-trihydroxy-hexahydrobenzoic acid), dihydroxy-dihydroshikimic acid (pentahydroxy-hexahydrobenzoic acid). Use may be made of their salts e. g. metal (calcium, sodium), ammonium and substituted ammonium salts. Use may be also made of derivatives of these acids which metabolize readily and are thus found by simple test to be the equivalent of the parent acid; examples of such derivatives include acetylated quinic acid, quinic lactone, chlorogenic acid, the monoacetone compound of quinic lactone. The acids of the present invention occur in different isomeric forms; it is understood that use may be made of individual isomers or mixtures of isomers, including optically active isomers and racemates thereof.

It is to be understood that these precursors are effective in increasing the yield in fermentation processes not only of tetracycline but also of chlortetracycline or oxytetracycline and are effective when used with any species of Streptomyces which produces the desired antibiotic and in the presence of any medium which supports antibiotic production by such species. These precursors are effective when used in the medium in a concentration of from 0.01% to 5.0% and preferably from 0.1% to 0.5%; the precursor being used may be added in its entirety at the start of the fermentation or gradually during the fermentation as it is consumed.

The following example will serve to illustrate the invention without limiting it thereto.

EXAMPLE I

One hundred cc. of a medium composed of 3% sucrose, 2% corn steep, 0.2% (NH₄)₂SO₄, 0.625% CaCO₃, 0.5% NaBr and distilled water q. s. 100% was placed in each of a series of 500 cc. flasks. Two were left untreated to serve as controls and D-(—)-quinic acid was added to two pairs of flasks at concentrations of 0.5% and 0.1% by weight of the media respectively. The flasks were then autoclaved (110° C., 15 lbs., 15 minutes), cooled and inoculated with 1.0 ml. of a spore suspension of a 13 day culture of *Streptomyces viridifaciens*. The flasks were then shaken on a rotary shaker at 28° C. for 116 hours. Samples were taken at 92 and 116 hours, acidified to pH 2.0–2.8 and bioassayed for tetracycline versus *B. subtilis* on agar plates at pH 8.0 with the following, tabulated results.

*Tetracycline content in mcg./ml.*

| Sample | By Bioassay | | By Ultra-violet Absorption Assay after 116 hours |
|---|---|---|---|
| | after 92 hours | after 116 hours | |
| Control | 223 | 377 | |
| Do | 249 | 272 | |
| 0.1% quinic acid | 388 | 600 | |
| 0.5% quinic acid | 544 | >1,000 | 1,157 |
| Do | | 650 | |

EXAMPLE II

Fermentation of *Streptomyces aureofaciens* (NRRL 2209) in a media identical with that of Example I except that the sodium bromide is replaced by sodium chloride produces increased yields of chlortetracycline when 0.1–0.5% quinic acid is added to the media.

EXAMPLE III

Fermentation of *Streptomyces rimosus* (NRRL 2234) in a media identical with that of Example I except that the sodium bromide is replaced by sodium chloride produces increased yields of oxytetracycline when 0.1%–0.5% quinic acid is added to the media.

EXAMPLE IV

Fermentation of *Streptomyces viridifaciens* in a media identical with that of Example I produces increased yields of tetracycline when 0.1%–0.5% 5-dehydroquinic acid is added to the media.

EXAMPLE V

Fermentation of *Streptomyces viridifaciens* in a media identical with that of Example I produces increased yields of tetracycline when 0.1%–0.5% shikimic acid is added to the media.

EXAMPLE VI

Fermentation of *Streptomyces viridifaciens* in a media identical with that of Example I produces increased yields of tetracycline when 0.1%–0.5% 5-dehydroshikimic acid is added to the media.

EXAMPLE VII

Fermentation of *Streptomyces viridifaciens* in a media identical with that of Example I produces increased yields of tetracycline when 0.1%–0.5% dihydroshikimic acid is added to the media.

EXAMPLE VIII

Fermentation of *Streptomyces aureofaciens* (NRRL 2209) in a media identical with that of Example I produces increased yields of tetracycline when 0.1%–0.5% quinic acid is added to the media.

EXAMPLE IX

Fermentation of *Streptomyces aureofaciens* (NRRL 2209) in a media identical with that of Example I produces increased yields of tetracycline when 0.1%–0.5% 5-dehydroquinic acid is added to the media.

EXAMPLE X

Fermentation of *Streptomyces aureofaciens* (NRRL 2209) in a media identical with that of Example I produces increased yields of tetracycline when 0.1%–0.5% shikimic acid is added to the media.

EXAMPLE XI

Fermentation of *Steptomyces aureofaciens* (NRRL 2209) in a media identical with that of Example I produces increased yields of tetracycline when 0.1%–0.5% 5-dehydroshikimic acid is added to the media.

EXAMPLE XII

Fermentation of *Streptomyces aureofaciens* (NRRL 2209) in a media identical with that of Example I produces increased yields of tetracycline when 0.1–0.5% dihydroshikimic acid is added to the media.

It will be understood that, without departing from the spirit of the invention, various modifications may be made in the specific examples described. The latter are illustrative only and not offered in a restricting sense, and there is no intention of excluding any equivalents of the features shown and described or portions thereof.

We claim:

1. In a process for the production of an antibiotic compound selected from the group consisting of tetracycline and substituted tetracyclines which comprises growing under aerobic conditions a culture of a species of Streptomyces which produces said antibiotic compound in an aqueous, nitrogenous nutrient containing carbohydrate solution, the step comprising growing said organism in said solution in the presence of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

2. In a process for the production of tetracycline which comprises growing under aerobic conditions a culture of a tetracycline-producing species of Streptomyces in an aqueous, nitrogenous nutrient containing carbohydrate solution, the step comprising growing said organism in said solution in the presence of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

3. In a process for the production of chlortetracycline which comprises growing under aerobic conditions a culture of a chlortetracycline-producing species of Streptomyces in an aqueous, nitrogenous nutrient containing carbohydrate solution, the step comprising growing said organism in said solution in the presence of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

4. In a process for the production of oxytetracycline which comprises growing under aerobic conditions a culture of an oxytetracycline-producing species of Streptomyces in an aqueous, nitrogenous nutrient containing carbohydrate solution, the step comprising growing said organism in said solution in the presence of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

5. In a process for the production of tetracycline which comprises growing under aerobic conditions a culture of a tetracycline-producing species of Streptomyces in an aqueous, nitrogenous nutrient containing carbohydrate solution, the step comprising growing said organism in said solution in the presence of from 0.01% to 5.0% of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

6. In a process for the production of chlortetracycline which comprises growing under aerobic conditions a culture of a chlortetracycline-producing species of Streptomyces in an aqueous, nitrogenous nutrient containing carbohydrate solution, the step comprising growing said organism in said solution in the presence of from 0.01% to 5.0% of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

7. In a process for the production of oxytetracycline which comprises growing under aerobic conditions a culture of an oxytetracycline-producing species of Streptomyces in an aqueous, nitrogenous nutrient containing carbohydrate solution, the step comprising growing said organism in said solution in the presence of from 0.01% to 5.0% of a member selected from the group consisting of quinic acid, shikimic acid, 5-dehydroquinic acid, 5-dehydroshikimic acid, salts thereof and metabolically convertible derivatives thereof until substantial antibacterial activity is imparted to said solution.

8. In a process for the production of tetracycline which comprises growing under aerobic conditions a culture of a tetracycline-producing species of Streptomyces in an aqueous, nitrogenous nutrient containing carbohydrate solution, the step comprising growing said organism in said solution in the presence of quinic acid until substantial antibacterial activity is imparted to said solution.

9. In a process for the production of chlortetracycline which comprises growing under aerobic conditions a culture of a chlortetracycline-producing species of Streptomyces in an aqueous, nitrogenous nutrient containing carbohydrate solution, the step comprising growing said organism in said solution in the presence of quinic acid until substantial antibacterial activity is imparted to said solution.

10. In a process for the production of oxytetracycline which comprises growing under aerobic conditions a culture of an oxytetracycline-producing species of Streptomyces in an aqueous, nitrogenous nutrient containing carbohydrate solution, the step comprising growing said organism in said solution in the presence of quinic acid until substantial antibacterial activity is imparted to said solution.

11. In a process for the production of tetracycline which comprises growing under aerobic conditions a culture of a tetracycline-producing species of Streptomyces in an aqueous, nitrogenous nutrient containing carbohydrate solution, the step comprising growing said organism in said solution in the presence of calcium quinate until substantial antibacterial activity is imparted to said solution.

12. In a process for the production of chlortetracycline which comprises growing under aerobic conditions a culture of a chlortetracycline-producing species of Streptomyces in an aqueous, nitrogenous, nutrient containing carbohydrate solution, the step comprising growing said organism in said solution in the presence of calcium quinate until substantial antibacterial activity is imparted to said solution.

13. In a process for the production of oxytetracycline which comprises growing under aerobic conditions a culture of an oxytetracycline-producing species of Streptomyces in an aqueous, nitrogenous nutrient containing carbohydrate solution, the step comprising growing said organism in said solution in the presence of calcium quinate until substantial antibacterial activity is imparted to said solution.

References Cited in the file of this patent

UNITED STATES PATENTS

| | | |
|---|---|---|
| 2,482,055 | Duggar | Sept. 13, 1949 |
| 2,516,080 | Sabin et al. | July 18, 1950 |
| 2,609,329 | Niedercorn | Sept. 2, 1952 |

OTHER REFERENCES

Stephen et al., Jour. Am. Chem. Soc., vol. 76, No. 15, pages 3568–3577.